United States Patent
Peng et al.

(10) Patent No.: US 12,400,629 B2
(45) Date of Patent: Aug. 26, 2025

(54) NOISE PROCESSING METHOD, ELECTRONIC DEVICE AND STORAGE MEDIUM

(71) Applicant: ZHEJIANG HENGYI PETROCHEMICAL CO., LTD., Hangzhou (CN)

(72) Inventors: Xiantao Peng, Hangzhou (CN); Peng Wang, Hangzhou (CN); Yibo Qiu, Hangzhou (CN); Mingyi Liu, Hangzhou (CN); Feng Xu, Hangzhou (CN); Xuan Wu, Hangzhou (CN)

(73) Assignee: ZHEJIANG HENGYI PETROCHEMICAL CO., LTD., Zhejiang (CN)

( * ) Notice: Subject to any disclaimer, the term of this patent is extended or adjusted under 35 U.S.C. 154(b) by 0 days.

(21) Appl. No.: 18/811,903

(22) Filed: Aug. 22, 2024

(65) Prior Publication Data

US 2025/0210025 A1     Jun. 26, 2025

(30) Foreign Application Priority Data

Dec. 22, 2023 (CN) .......................... 202311783127.0

(51) Int. Cl.
G10K 11/175     (2006.01)

(52) U.S. Cl.
CPC ................ *G10K 11/1752* (2020.05)

(58) Field of Classification Search
CPC ....... G10K 11/17873; G10K 11/17857; G10K 11/1787; G10K 2210/3047;

(Continued)

(56) References Cited

U.S. PATENT DOCUMENTS

| 2003/0103635 A1 | 6/2003 | Xu et al. |
| 2012/0237049 A1 | 9/2012 | Brown et al. |

(Continued)

FOREIGN PATENT DOCUMENTS

| CN | 109195866 A | 1/2019 |
| CN | 113808566 A | 12/2021 |

(Continued)

OTHER PUBLICATIONS

Feb. 6, 2024—First Office Action and Search Report issued in Chinese Patent Application No. 202311783127.0.

(Continued)

*Primary Examiner* — Paul Kim
(74) *Attorney, Agent, or Firm* — Banner & Witcoff, Ltd.

(57) ABSTRACT

Provided is a noise processing method, relating to the field of data processing. The method includes: obtaining a first noise signal at a position of a target person in a target workshop in a first time period; predicting an overall control parameter of multiple signal transmitters in a second time period based on the first noise signal to obtain a current parameter prediction result; determining one or more target transmitters that need to work in the second time period from the multiple signal transmitters based on the result, and obtaining a parameter prediction value of each target transmitter in the second time period; and controlling each target transmitter to transmit a noise interference signal in the second time period according to a corresponding parameter prediction value to weaken a second noise signal at the position of the target person in the target workshop in the second time period.

17 Claims, 5 Drawing Sheets

(58) Field of Classification Search
CPC ........ G10K 2210/3038; G10L 21/0224; G10L 21/0264; Y02P 90/02
USPC ...................................................... 381/73.1
See application file for complete search history.

(56) References Cited

U.S. PATENT DOCUMENTS

2019/0251948 A1*  8/2019  Hayashi ........... G10K 11/17857
2020/0312294 A1   10/2020  Isberg et al.
2023/0097755 A1    3/2023  Seneger et al.

FOREIGN PATENT DOCUMENTS

| | | |
|---|---|---|
| CN | 113903322 A | 1/2022 |
| CN | 115002784 A | 9/2022 |
| CN | 116709159 A | 9/2023 |
| CN | 116884382 A | 10/2023 |
| DE | 102014221787 A1 | 4/2016 |
| JP | A1995028480 | 7/1993 |

OTHER PUBLICATIONS

Feb. 26, 2024—Notification on Grant of the Patent Right for Invention issued in Chinese Patent Application No. 202311783127.0.
Jan. 15, 2025—EP24194341.4—EESR.
JP2024-225528 Notice of Allowance and Translation.

* cited by examiner

NOISE PROCESSING METHOD, ELECTRONIC DEVICE AND STORAGE MEDIUM

CROSS-REFERENCE TO RELATED APPLICATIONS

The present application claims priority to Chinese Patent Application No. CN202311783127.0, filed with the China National Intellectual Property Administration on Dec. 22, 2023, the disclosure of which is hereby incorporated herein by reference in its entirety.

TECHNICAL FIELD

The present disclosure relates to the field of data processing, and in particular, to a noise processing method and apparatus, an electronic device, and a storage medium.

BACKGROUND

In the industrial environment of the spinning process, the complexity and length of the process workflow necessitate the establishment of a plurality of functionally different production workshops. A large number of process equipment units are installed in each production workshop, which can generate significant noise pollution when working.

SUMMARY

The present disclosure provides a noise processing method and apparatus, an electronic device and a storage medium, so as to solve or alleviate one or more technical problems in the existing art.

In a first aspect, the present disclosure provides a noise processing method applied to an electronic device, the electronic device being communicated with a plurality of signal transmitters arranged in a target workshop, an arrangement mode of the plurality of signal transmitters in the target workshop being related to a real-time noise sound field in the target workshop, and the method including:
  obtaining a first noise signal at a position of a target person in the target workshop in a first time period;
  predicting an overall control parameter of the plurality of signal transmitters in a second time period based on the first noise signal to obtain a current parameter prediction result, wherein the second time period is a future time period of the first time period;
  determining one or more target transmitters that need to work in the second time period from the plurality of signal transmitters based on the current parameter prediction result, and obtaining a parameter prediction value of each target transmitter in the second time period; and
  controlling each target transmitter to transmit a noise interference signal in the second time period according to a corresponding parameter prediction value to weaken a second noise signal at the position of the target person in the target workshop in the second time period.

In a second aspect, the present disclosure provides a noise processing apparatus applied to an electronic device, the electronic device being communicated with a plurality of signal transmitters arranged in a target workshop, an arrangement mode of the plurality of signal transmitters in the target workshop being related to a real-time noise sound field in the target workshop, and the apparatus including:
  a first obtaining unit, configured to obtain a first noise signal at a position of a target person in the target workshop in a first time period;
  a second obtaining unit, configured to predict, based on the first noise signal, an overall control parameter of a plurality of signal transmitters in a second time period to obtain a current parameter prediction result, wherein the second time period is a future time period of the first time period;
  a third obtaining unit, configured to determine, based on the current parameter prediction result, one or more target transmitters that need to work in the second time period from the plurality of signal transmitters, and obtain a parameter prediction value of each target transmitter in the second time period; and
  a transmission control unit, configured to control each target transmitter to transmit a noise interference signal in the second time period according to a corresponding parameter prediction value to weaken a second noise signal at the position of the target person in the target workshop in the second time period.

In a third aspect, the present disclosure provides an electronic device, including:
  at least one processor; and
  a memory connected in communication with the at least one processor;
  wherein the memory stores an instruction executable by the at least one processor, and the instruction, when executed by the at least one processor, enables the at least one processor to execute the method according to any one of the embodiments of the present disclosure.

In a fourth aspect, the present disclosure provides a non-transitory computer readable storage medium storing a computer instruction thereon, wherein the computer instruction is used to cause a computer to execute the method according to any one of the embodiments of the present disclosure.

In a fifth aspect, the present disclosure provides a computer program product including a computer program which, when executed by a processor, executes the method according to any one of the embodiments of the present disclosure.

By adopting the scheme of the disclosure, after the first noise signal at the position of the target person in the target workshop in the first time period is obtained, the overall control parameter of the plurality of signal transmitters in the second time period (the future time period of the first time period) can be predicted based on the first noise signal to obtain the current parameter prediction result. Since the current parameter prediction result is obtained based on the prediction of the first noise signal and not by directly analyzing the first noise signal, aiming to establish a strong correlation with the second time period, after one or more target transmitters that need to work in the second time period are determined from the plurality of signal transmitters based on the current parameter prediction result and the parameter prediction value of each target transmitter in the second time period is obtained, the control of the noise interference signal transmitted by each target transmitter in the second time period according to the corresponding parameter prediction value can generate a better offset effect on the second noise signal at the position of the target person in the target workshop in the second time period, thereby weakening the second noise signal at the position of the target person in the target workshop in the second time period and reducing the noise pollution in the target workshop.

It should be understood that the content described in this part is not intended to identify critical or essential features of the embodiments of the present disclosure, nor is it used to limit the scope of the present disclosure. Other features of the present disclosure will become readily apparent through the following description.

BRIEF DESCRIPTION OF THE DRAWINGS

In the drawings, like reference numerals denote like or similar parts or elements throughout the several views unless otherwise specified. The figures are not necessarily to scale. It should be understood that these drawings depict only some of the embodiments provided in accordance with the disclosure and are therefore not to be considered limiting of its scope.

DETAILED DESCRIPTION

Figure 1:
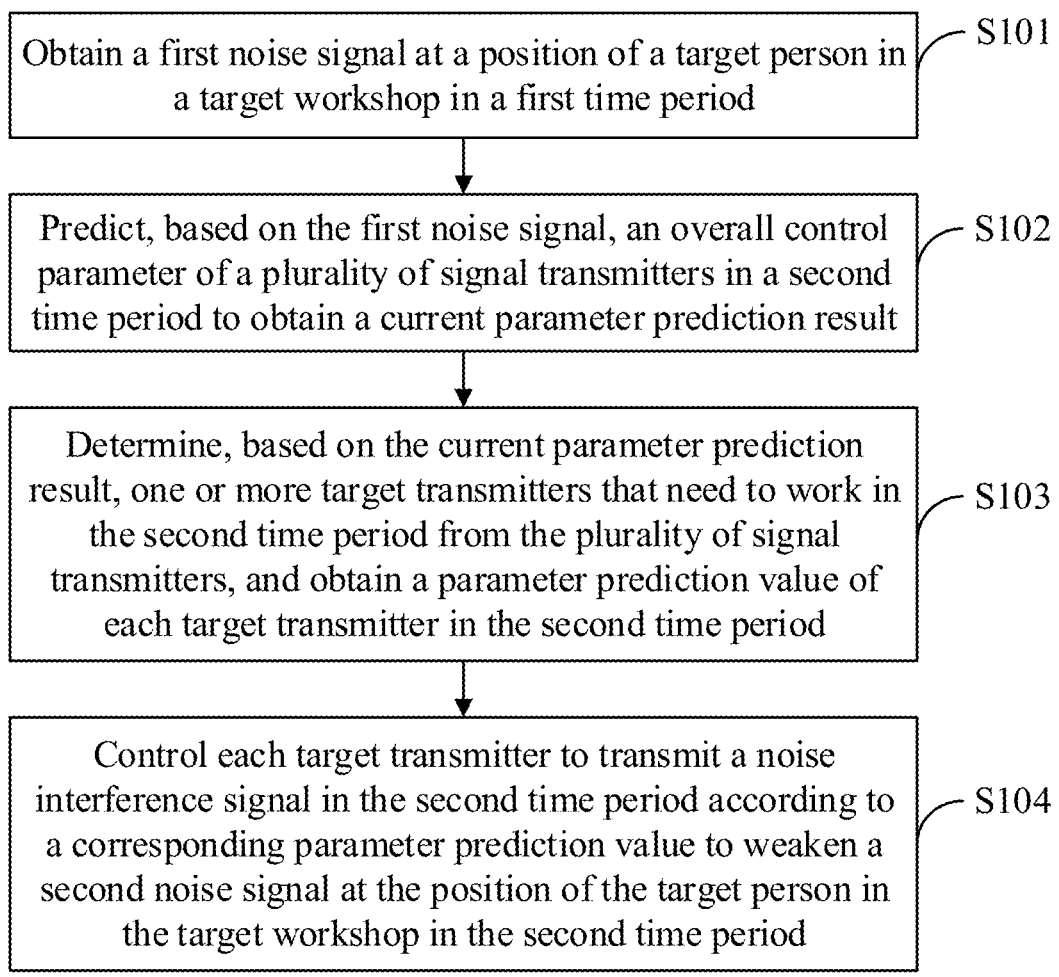
FIG. 1 is a schematic flowchart illustrating a noise processing method according to an embodiment of the present disclosure.

The present disclosure will be described in further detail below with reference to the accompanying drawings. In the drawings, like reference numerals indicate functionally identical or similar elements. While the various aspects of the embodiments are presented in drawings, the drawings are not necessarily to scale unless specifically indicated.

In addition, to better illustrate the present disclosure, numerous specific details are set forth in the following detailed description of the embodiments. It should be understood by those skilled in the art that the present disclosure may be practiced without these specific details. In some instances, methods, procedures, components, circuits, and the like that are well known to those skilled in the art have not been described in detail so as not to obscure the present disclosure.

As mentioned previously, in the industrial environment of the spinning process, the complexity and length of the process workflow necessitate the establishment of a plurality of functionally different production workshops. A large number of process equipment units are installed in each production workshop, which can generate significant noise pollution when working. For example, for a spinning workshop responsible for producing a yarn spindle product, a large number of process equipment units, namely spinning manifolds, are arranged in the spinning workshop, and the spinning manifolds can generate significantly noise pollution in the spinning workshop when working; for another example, for a winding workshop responsible for winding the yarn spindle product, a large number of process devices, namely winding machines, are arranged in the winding workshop, and the winding machines can generate significantly noise pollution in the winding workshop when working.

In order to reduce noise pollution in the production workshop, an embodiment of the present disclosure provides a noise processing method, which is applied to an electronic device, the electronic device is in communication with a plurality of signal transmitters arranged in a target workshop, and an arrangement of the plurality of signal transmitters in the target workshop is related to a sound field of real-time noise in the target workshop. The target workshop can be any one of a plurality of production workshops with different functions related to the spinning process; and the signal transmitter can be a speaker.

In addition, it should be noted that, in the embodiment of the present disclosure, a main type of the yarn spindle product may include at least one of Partially Oriented Yarns (POY), Fully Drawn Yarns (FDY), Draw Textured Yarns (DTY) (or called low-stretch Yarns), or the like. For example, the type of the yarn spindle product may specifically include Polyester Partially Oriented Yarns, Polyester Fully Drawn Yarns, Polyester Drawn Yarns, Polyester Draw Textured Yarns, or the like.

FIG. 1 is a schematic flowchart illustrating a noise processing method according to an embodiment of the disclosure. Hereinafter, the noise processing method according to the embodiment of the present disclosure will be described with reference to FIG. 1. It should be noted that although a logical order is shown in the flowchart, steps shown or described may be performed in other orders in some cases.

Step S101, a first noise signal at a position of a target person in a target workshop in a first time period is obtained.

The first time period may be a current time period with a time length of a first preset time length. In one example, the first preset time length may be determined according to a moving speed of the target person. For example, the first preset time length may be negatively related to the moving speed of the target person. That is, the faster the moving speed of the target person, the shorter the first preset time length; the slower the moving speed of the target person, the longer the first preset time length.

In addition, in the embodiment of the present disclosure, the target person may be an operator who enters the target workshop; the first noise signal may be a real-time noise signal that is perceptible to the target person during the first time period. In one example, the first noise signal may be collected through a first sound pick-up device worn by the target person and transmitted to the electronic device. The first sound pick-up device can be an electromagnetic sound pick-up device, a piezoelectric sound pick-up device, an optical fiber sound pick-up device, a digital sound pick-up device, for example.

Step S102, an overall control parameter of a plurality of signal transmitters in a second time period is predicted based on the first noise signal to obtain a current parameter prediction result.

The second time period is a future time period of the first time period. For example, the second time period may be a future period of the first time period with a time length of a second preset time length. In the embodiment of the present disclosure, the second preset time length may be equal to the first preset time length, or may be different from the first preset time length. In one example, the second preset time length may be determined according to a moving speed of the target person. For example, the second preset time length may be negatively related to the moving speed of the target person. That is, the faster the moving speed of the target person, the shorter the second preset time length; the slower the moving speed of the target person, the longer the second preset time length.

In addition, in the embodiment of the present disclosure, the current parameter prediction result may be used to control a working state of each signal transmitter in the second time period.

Step S103, one or more target transmitters that need to work in the second time period are determined from the plurality of signal transmitters based on the current parameter prediction result, and a parameter prediction value of each target transmitter in the second time period is obtained.

Since the current parameter prediction result can be used to control the working state of each signal transmitter in the second time period, it can be determined, for each signal transmitter, whether the signal transmitter is a target transmitter that needs to work in the second time period based on the current parameter prediction result, and the parameter prediction value of each target transmitter in the second time period can be obtained. The parameter prediction value can include a frequency prediction value, a phase prediction value, an amplitude prediction value and a direction prediction value.

Step S104, each target transmitter is controlled to transmit a noise interference signal in the second time period according to a corresponding parameter prediction value to weaken a second noise signal at the position of the target person in the target workshop in the second time period.

The second noise signal may be a real-time noise signal that is perceptible to the target person during the second time period.

After each target transmitter is controlled to transmit the noise interference signal in the second time period according to the corresponding parameter prediction value, the noise interference signal can generate an offset effect on the second noise signal at the position of the target person in the target workshop in the second time period, thereby weakening the second noise signal at the position of the target person in the target workshop in the second time period.

By adopting the scheme of the disclosure, after the first noise signal at the position of the target person in the target workshop in the first time period is obtained, the overall control parameter of the plurality of signal transmitters in the second time period (the future time period of the first time period) can be predicted based on the first noise signal to obtain the current parameter prediction result. Since the current parameter prediction result is obtained based on the prediction of the first noise signal and not by directly analyzing the first noise signal, aiming to establish a strong correlation with the second time period, after one or more target transmitters that need to start working in the second time period are determined from the plurality of signal transmitters based on the current parameter prediction result and the parameter prediction value of each target transmitter in the second time period is obtained, the control of the noise interference signal transmitted by each target transmitter in the second time period according to the corresponding parameter prediction value can generate a better offset effect on the second noise signal at the position of the target person in the target workshop in the second time period, thereby weakening the second noise signal at the position of the target person in the target workshop in the second time period and reducing the noise pollution in the target workshop.

Figure 2:
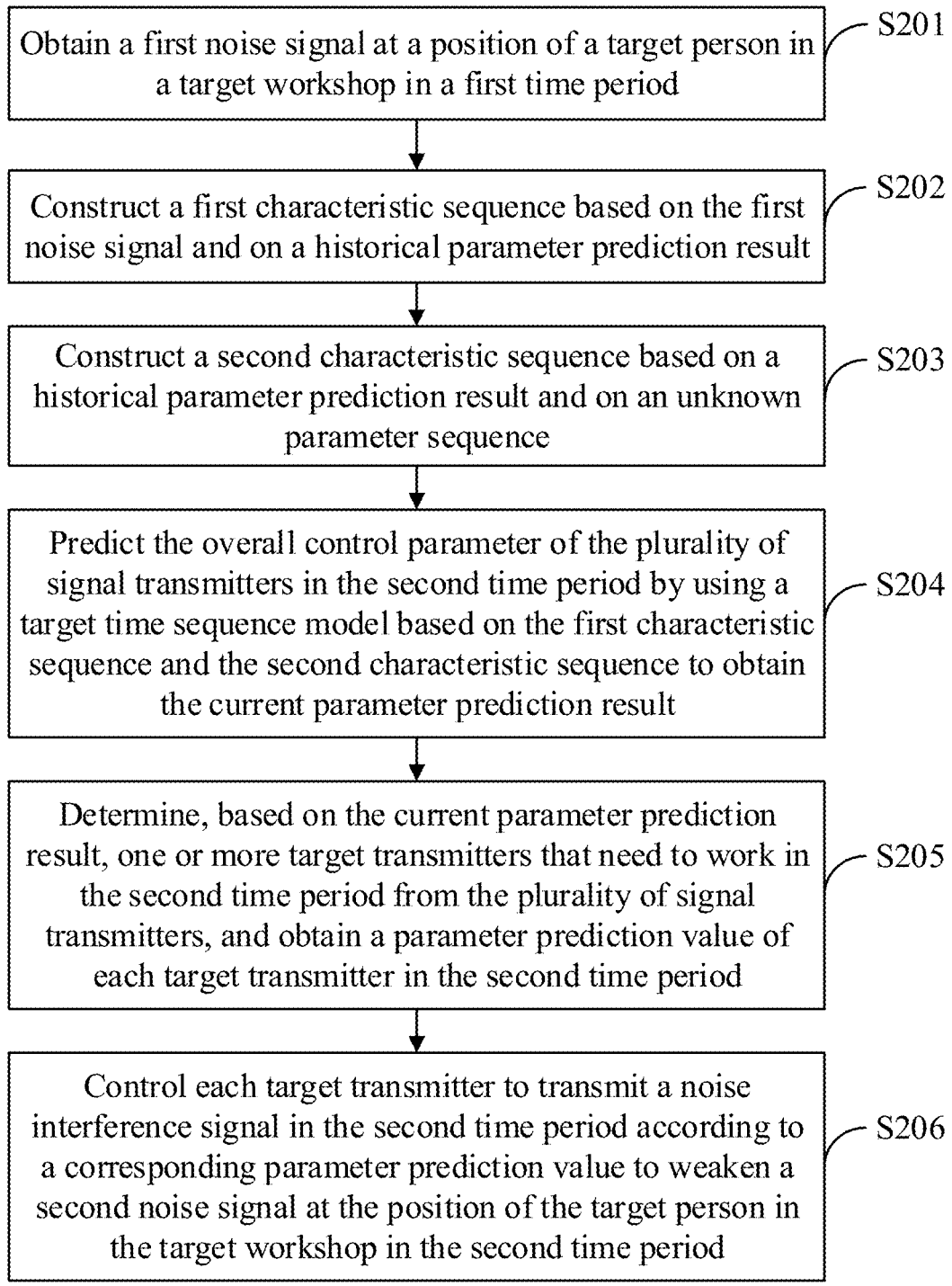
FIG. 2 is another schematic flowchart illustrating a noise processing method according to an embodiment of the disclosure.

FIG. 2 is another schematic flowchart illustrating a noise processing method according to an embodiment of the disclosure. Hereinafter, the noise processing method according to the embodiment of the present disclosure will be described with reference to FIG. 2. It should be noted that although a logical order is shown in the flowchart, steps shown or described may be performed in other orders in some cases.

Step S201, a first noise signal at a position of a target person in a target workshop in a first time period is obtained.

The first time period may be a current time period with a time length of a first preset time length. In one example, the first preset time length may be determined according to a moving speed of the target person. For example, the first preset time length may be negatively related to the moving speed of the target person. That is, the faster the moving speed of the target person, the shorter the first preset time length; the slower the moving speed of the target person, the longer the first preset time length.

In addition, in the embodiment of the present disclosure, the target person may be an operator who enters the target workshop; the first noise signal may be a real-time noise signal that is perceptible to the target person during the first time period. In one example, the first noise signal may be collected through a first sound pick-up device worn by the target person and transmitted to the electronic device. The first sound pick-up device can be an electromagnetic sound pick-up device, a piezoelectric sound pick-up device, an optical fiber sound pick-up device, a digital sound pick-up device, for example.

Step S202, a first characteristic sequence is constructed based on the first noise signal and on a historical parameter prediction result.

The historical parameter prediction result is obtained by predicting the overall control parameter of the plurality of signal transmitters in the first time period based on a zeroth noise signal at the position of the target person in the target workshop in a zeroth time period; the zeroth time period is a history time period of the first time period. For example, the zeroth time period may be a history time period of the first time period with a time length of a third preset time length. In the embodiment of the present disclosure, the third preset time length may be equal to the first preset time length, or may be different from the first preset time length. In one example, the third preset time length may be determined according to a moving speed of the target person. For example, the third preset time length may be negatively related to the moving speed of the target person. That is, the faster the moving speed of the target person, the shorter the third preset time length; the slower the moving speed of the target person, the longer the third preset time length.

In addition, in the embodiment of the present disclosure, the historical parameter prediction result may be used to control a working state of each signal transmitter in the first time period. More specifically, for each signal transmitter, a historical transmission parameter of the signal transmitter in the first time period can be obtained based on the historical parameter prediction result.

The historical transmission parameter may include a frequency value, a phase value, an amplitude value and a direction value.

In an optional embodiment, Step S202 may include:

Step S202-1, a noise signal sequence arranged according to a time sequence is obtained based on the first noise signal.

In an example, based on the first noise signal, the obtained noise signal sequence arranged according to the time sequence may be represented as $\{X_{11}, X_{12} \ldots X_{1n}\}$, where $X_{11}$ represents noise data at the position of the target person in the target workshop at time $T_{11}$ in the first time period, which may specifically include a frequency value $F_{11}$, a phase value $P_{11}$, an amplitude value $A_{11}$ and a direction value $D_{11}$, $X_{12}$ represents noise data at the position of the target person in the target workshop at time $T_{12}$ in the first time period, which may specifically include a frequency value $F_{12}$, a phase value $P_{12}$, an amplitude value $A_{12}$ and a direction value $D_{12}$, and so on, $X_{1n}$ represents noise data at the position of the target person in the target workshop at time $T_{1n}$ in the first time period, which may specifically include a frequency value $F_{1n}$, a phase value $P_{1n}$, an amplitude value Ain and a direction value $D_{1n}$.

Step S202-2, a known parameter sequence arranged according to the time sequence is obtained based on the historical parameter prediction result.

In one example, the number of signal transmitters in the target workshop is K (K≥2 and is an integer), the known parameter sequence may include K known parameter subsequences corresponding to the K signal transmitters one to one, and the known parameter subsequence corresponding to the $i^{th}$ signal transmitter in the K signal transmitters may be represented as $\{Qi_{11}, Qi_{12} \ldots Qi_{1n}\}$, where 1≤i≤K, and i is a positive integer.

When i=1, $Q1_{11}$ represents a historical parameter prediction value of the first signal transmitter in the K signal transmitters at time $T_{11}$ in the first time period, which may specifically include a frequency prediction value $F1_{11}$, a phase prediction value $P1_{11}$, an amplitude prediction value $A1_{11}$ and a direction prediction value $D1_{11}$, $Q1_{12}$ represents a historical parameter prediction value of the first signal transmitter in the K signal transmitters at time $T_{12}$ in the first time period, which may specifically include a frequency prediction value $F1_{12}$, a phase prediction value $P1_{12}$, an amplitude prediction value $A1_{12}$ and a direction prediction value $D1_{12}$, and so on, $Q1_{1n}$ represents a historical parameter prediction value of the first signal transmitter in the K signal transmitters at time $T_{1n}$ in the first time period, which may specifically include a frequency prediction value $F1_{1n}$, a phase prediction value $P1_{1n}$, an amplitude prediction value $A1_{1n}$ and a direction prediction value $D1_{1n}$.

When i takes other values, $Qi_{11}$ and $Qi_{12} \ldots Qi_{1n}$ can be understood with reference to the related contents as set forth above and will not be described herein again.

Step S202-3, the known parameter sequence on the noise signal sequence is spliced to obtain a first initial sequence.

Step S202-4, a first additional characteristic is obtained based on real-time task information of the target workshop.

The real-time task information may include a product type and a product specification of a yarn spindle product processed by the target workshop, for example. In addition, in the embodiment of the disclosure, working parameters used by the process equipment units in the target workshop during working can be obtained based on the real-time task information. When the target workshop is a spinning workshop, the process equipment unit in the target workshop is a spinning manifold, and a working parameter used by the spinning manifold when working can include a specification parameter of a spinneret plate in the spinning manifold and a spinning speed, for example; when the target workshop is a winding workshop, the process equipment unit in the target workshop is a winding machine, and the working parameter of the winding machine during working can include a brand, a specification parameter, a winding speed and the number of winding heads of the winding machine, for example.

In this respect, in one example, the real-time task information and a first workshop identifier of the target workshop can be used together as the first additional characteristic, or working parameters used by the process equipment units in the target workshop when working and the first workshop identifier of the target workshop can be used together as the first additional characteristic. The first workshop identifier of the target workshop can be used to determine a processing task type, a workshop position and the like of the target workshop, and the processing task type can include production of yarn spindle product and winding of yarn spindle product, for example.

Step S202-5, the first characteristic sequence is constructed based on the first initial sequence and the first additional characteristic.

Continuing with the previous example, the noise signal sequence may be represented as $\{X_{11}, X_{12} \ldots X_{1n}\}$, the number of signal transmitters in the target workshop is K (K≥2, and is an integer), the known parameter sequence may include K known parameter subsequences corresponding to the K signal transmitters one-to-one, and the known parameter subsequence corresponding to the $i^{th}$ signal transmitter in the K signal transmitters may be represented as $\{Qi_{11}, Qi_{12} \ldots Qi_{1n}\}$, where 1≤i≤K, and i is a positive integer. When the first additional characteristic includes the real-time task information and the first workshop identifier of the target workshop, the first characteristic sequence that is constructed based on the first initial sequence obtained by splicing the known parameter sequence on the noise signal sequence and first additional characteristic obtained based on the real-time task information of the target workshop can include characteristic data as shown in Table 1:

TABLE 1

| | First Time Period | | | First Time Period | | |
|---|---|---|---|---|---|---|
| $T_{11}$ | $T_{12}$ | ... $T_{1n}$ | $T_{11}$ | $T_{12}$ | ... $T_{1n}$ |
| $X_{11} = \{F_{11}, P_{11}, A_{11}, D_{11}\}$ | $X_{12} = \{F_{12}, P_{12}, A_{12}, D_{12}\}$ | ... $X_{1n} = \{F_{1n}, P_{1n}, A_{1n}, D_{1n}\}$ | $Q1_{11} = \{F1_{11}, P1_{11}, A1_{11}, D1_{11}\}$ | $Q1_{12} = \{F1_{12}, P1_{12}, A1_{12}, D1_{12}\}$ | ... $Q1_{1n} = \{F1_{1n}, P1_{1n}, A1_{1n}, D1_{1n}\}$ |
| | | | $Q2_{11} = \{F2_{11}, P2_{11}, A2_{11}, D2_{11}\}$ | $Q2_{12} = \{F2_{12}, P2_{12}, A2_{12}, D2_{12}\}$ | ... $Q2_{1n} = \{F2_{1n}, P2_{1n}, A2_{1n}, D2_{1n}\}$ |
| | | | ... | ... | ...... |
| | | | $QK_{11} = \{FK_{11}, PK_{11}, AK_{11}, DK_{11}\}$ | $QK_{12} = \{FK_{12}, PK_{12}, AK_{12}, DK_{12}\}$ | ... $QK_{1n} = \{FK_{1n}, PK_{1n}, AK_{1n}, DK_{1n}\}$ |
| $Y_{11} = \{Ty_{11},$ | $Y_{12} = \{Ty_{12},$ | ... $Y_{1n} = \{Ty_{1n},$ | $Y_{11} = \{Ty_{11},$ | $Y_{12} = \{Ty_{12},$ | ... $Y_{1n} = \{Ty_{1n},$ |

TABLE 1-continued

| First Time Period | | | First Time Period | | |
|---|---|---|---|---|---|
| $T_{11}$ | $T_{12}$ | ... $T_{1n}$ | $T_{11}$ | $T_{12}$ | ... $T_{1n}$ |
| $Sp_{11}$ ... }, Wid | $Sp_{12}$ ... }, Wid | $Sp_{1n}$ ... }, Wid | $Sp_{11}$ ... }, Wid | $Sp_{12}$ ... }, Wid | $Sp_{1n}$ ... }, Wid | where $Y_{11}$ represents the real-time task information of the target workshop at the time $T_{11}$ in the first time period, which may specifically include a product type $Ty_{11}$ and a product specification $Sp_{11}$ of a yarn spindle product processed by the target workshop at the time $T_{11}$ in the first time period, $Y_{12}$ represents the real-time task information of the target workshop at the time $T_{12}$ in the first time period, which may specifically include a product type $Ty_{12}$ and a product specification $Sp_{12}$ of a yarn spindle product processed by the target workshop at the time $T_{12}$ in the first time period, and so on, $Y_{1n}$ represents the real-time task information of the target workshop at the time $T_{1n}$ in the first time period, which may specifically include a product type $Ty_{1n}$ and a product specification $Sp_{1n}$ of a yarn spindle product processed by the target workshop at the time $T_{1n}$ in the first time period, and Wid represents a first workshop identifier of the target workshop.

In this way, in the embodiment of the present disclosure, the first characteristic sequence may further include a first additional characteristic obtained based on the real-time task information of the target workshop in addition to the first initial sequence obtained by splicing the known parameter sequence on the noise signal sequence, so that comprehensiveness of characteristic data included in the first characteristic sequence can be ensured, thereby improving reliability of a current parameter prediction result.

Step S203, a second characteristic sequence is constructed based on a historical parameter prediction result and on an unknown parameter sequence.

The historical parameter prediction result can be understood by referring to the foregoing related contents, which will not be described herein again.

In addition, in the embodiment of the present disclosure, the unknown parameter sequence is an input sequence corresponding to the current parameter prediction result, and a sequence length of the unknown parameter sequence may be equal to or different from a sequence length of the known parameter sequence.

Continuing with the previous example, the number of signal transmitters in the target workshop is K (K≥2 and is an integer), the unknown parameter sequence may also include K unknown parameter subsequences corresponding to the K signal transmitters one-to-one, and the unknown parameter subsequence corresponding to the $i^{th}$ signal transmitter in the K signal transmitters may be represented as $\{Zi_{21}, Zi_{22} \ldots Zi_{2n}\}$, where $1 \le i \le K$, and i is a positive integer.

When i=1, $Z1_{21}$ represents a data element corresponding to a parameter prediction value of the first signal transmitter in the K signal transmitters at time $T_{21}$ in the second time period, which may specifically include a data element corresponding to a frequency prediction value $F1_{21}$, a data element corresponding to a phase prediction value $P1_{21}$, a data element corresponding to an amplitude prediction value $A1_{21}$, and a data element corresponding to a direction prediction value $D1_{21}$, and the four values may be any set values, for example, may be 0; $Z1_{22}$ represents a data element corresponding to a parameter prediction value of the first signal transmitter in the K signal transmitters at time $T_{22}$ in the second time period, which may specifically include a data element corresponding to a frequency prediction value $F1_{22}$, a data element corresponding to a phase prediction value $P1_{22}$, a data element corresponding to an amplitude prediction value $A1_{22}$, and a data element corresponding to a direction prediction value $D1_{22}$, and the four values may be any set values, for example, may be 0, and so on; $Z1_{2n}$ represents a data element corresponding to a parameter prediction value of the first signal transmitter in the K signal transmitters at time $T_{2n}$ in the second time period, which may specifically include a data element corresponding to a frequency prediction value $F1_{2n}$, a data element corresponding to a phase prediction value $P1_{2n}$, a data element corresponding to an amplitude prediction value $A1_{2n}$, and a data element corresponding to a direction prediction value $D1_{2n}$.

When i has another value, $Zi_{21}, Zi_{22} \ldots Zi_{2n}$ can be understood by referring to the foregoing related contents, and will not be described herein again.

In an optional embodiment, Step S203 may include:

Step S203-1, the known parameter sequence arranged according to the time sequence is obtained based on the historical parameter prediction result.

The known parameter sequence can be understood by referring to the foregoing related contents, and will not be described in detail herein.

Step S203-2, the unknown parameter sequence is spliced on the known parameter sequence to obtain a second initial sequence.

Step S203-3, a second additional characteristic is obtained based on the real-time task information of the target workshop.

As previously described, the real-time task information may include a product type and a product specification of a yarn spindle product processed by the target workshop, for example. In addition, in the embodiment of the disclosure, working parameters used by the process equipment units in the target workshop during working can be obtained based on the real-time task information. When the target workshop is a spinning workshop, the process equipment unit in the target workshop is a spinning manifold, and a working parameter used by the spinning manifold when working can include a specification parameter of a spinneret plate in the spinning manifold and a spinning speed, for example; when the target workshop is a winding workshop, the process equipment unit in the target workshop is a winding machine, and the working parameter of the winding machine when working can include a brand, a specification parameter, a winding speed and the number of winding heads of the winding machine, for example.

In this respect, in one example, the real-time task information and the first workshop identifier of the target workshop can be used together as a second additional characteristic, or the working parameters used by the process equipment units in the target workshop when working and the first workshop identifier of the target workshop can be used together as the second additional characteristic. The first workshop identifier of the target workshop can be used to determine a processing task type, a workshop position and the like of the target workshop, and the processing task type can include production of yarn spindle product and winding of yarn spindle product, for example.

Step S203-4, the second characteristic sequence is constructed based on the second initial sequence and the second additional characteristic.

Continuing with the previous example, the number of signal transmitters in the target workshop is K (K≥2 and is an integer), the known parameter sequence may include K known parameter subsequences corresponding to the K signal transmitters one-to-one, the known parameter subsequence corresponding to the $i^{th}$ signal transmitter in the K signal transmitters may be represented as $\{Qi_{11}, Qi_{12} \ldots Qi_{1n}\}$, and the unknown parameter subsequence corresponding to the $i^{th}$ signal transmitter in the K signal transmitters may be represented as $\{Zi_{21}, Zi_{22} \ldots Zi_{2n}\}$, where $1 \leq i \leq K$, and i is a positive integer. When the second additional characteristic includes the real-time task information and the first workshop identifier of the target workshop, the second characteristic sequence that is constructed based on the second initial sequence obtained by splicing the unknown parameter sequence on the known parameter sequence and the second additional characteristic obtained based on the real-time task information of the target workshop can include characteristic data as shown in Table 2:

represents the real-time task information of the target workshop at the time $T_{22}$ in the second time period, which may specifically include a product type $Ty_{22}$ and a product specification $Sp_{22}$ of a yarn spindle product processed by the target workshop at the time $T_{22}$ in the second time period, and so on, $Y_{2n}$ represents the real-time task information of the target workshop at the time $T_{2n}$ in the second time period, which may specifically include a product type $Ty_{2n}$ and a product specification $Sp_{2n}$ of a yarn spindle product processed by the target workshop at the time $T_{2n}$ in the second time period; and Wid represents a first workshop identifier of the target workshop.

In this way, in the embodiment of the present disclosure, the second characteristic sequence may further include a second additional characteristic obtained based on the real-time task information of the target workshop in addition to the second initial sequence obtained by splicing the unknown parameter sequence on the known parameter sequence, so that the comprehensiveness of characteristic data included in the second characteristic sequence can be ensured, thereby improving the reliability of the current parameter prediction result.

Step S204, the overall control parameter of the plurality of signal transmitters in the second time period is predicted by using a target time sequence model based on the first

TABLE 2

| | First Time Period | | | Second Time Period | | |
|---|---|---|---|---|---|---|
| $T_{11}$ | $T_{12}$ | ... $T_{1n}$ | $T_{21}$ | $T_{22}$ | ... $T_{2n}$ |
| $Q1_{11} = \{F1_{11}, P1_{11}, A1_{11}, D1_{11}\}$ | $Q1_{12} = \{F1_{12}, P1_{12}, A1_{12}, D1_{12}\}$ | ... $Q1_{1n} = \{F1_{1n}, P1_{1n}, A1_{1n}, D1_{1n}\}$ | $Z1_{21} = \{0, 0, 0, 0\}$ | $Z1_{22} = \{0, 0, 0, 0\}$ | ... $Z1_{2n} = \{0, 0, 0, 0\}$ |
| $Q2_{11} = \{F2_{11}, P2_{11}, A2_{11}, D2_{11}\}$ | $Q2_{12} = \{F2_{12}, P2_{12}, A2_{12}, D2_{12}\}$ | ... $Q2_{1n} = \{F2_{1n}, P2_{1n}, A2_{1n}, D2_{1n}\}$ | $Z2_{21} = \{0, 0, 0, 0\}$ | $Z2_{22} = \{0, 0, 0, 0\}$ | ... $Z2_{2n} = \{0, 0, 0, 0\}$ |
| ... | ... | ... ... | ... | ... | ... ... |
| $QK_{11} = \{FK_{11}, PK_{11}, AK_{11}, DK_{11}\}$ | $QK_{12} = \{FK_{12}, PK_{12}, AK_{12}, DK_{12}\}$ | ... $QK_{1n} = \{FK_{1n}, PK_{1n}, AK_{1n}, DK_{1n}\}$ | $ZK_{21} = \{0, 0, 0, 0\}$ | $ZK_{22} = \{0, 0, 0, 0\}$ | ... $ZK_{2n} = \{0, 0, 0, 0\}$ |
| $Y_{11} = \{Ty_{11}, Sp_{11} \ldots \}$, Wid | $Y_{12} = \{Ty_{12}, Sp_{12} \ldots \}$, Wid | ... $Y_{1n} = \{Ty_{1n}, Sp_{1n} \ldots \}$, Wid | $Y_{21} = \{Ty_{21}, Sp_{21} \ldots \}$, Wid | $Y_{22} = \{Ty_{22}, Sp_{22} \ldots \}$, Wid | ... $Y_{2n} = \{Ty_{2n}, Sp_{2n} \ldots \}$, Wid | where $Y_{11}$ represents the real-time task information of the target workshop at the time $T_{11}$ in the first time period, which may specifically include a product type $Ty_{11}$ and a product specification $Sp_{11}$ of a yarn spindle product processed by the target workshop at the time $T_{11}$ in the first time period, $Y_{12}$ represents the real-time task information of the target workshop at the time $T_{12}$ in the first time period, which may specifically include a product type $Ty_{12}$ and a product specification $Sp_{12}$ of a yarn spindle product processed by the target workshop at the time $T_{12}$ in the first time period, and so on, Yin represents the real-time task information of the target workshop at the time $T_{1n}$ in the first time period, which may specifically include a product type $Ty_{1n}$ and a product specification $Sp_{1n}$ of a yarn spindle product processed by the target workshop at the time $T_{1n}$ in the first time period; $Y_{21}$ represents the real-time task information of the target workshop at the time $T_{21}$ in the second time period, which may specifically include a product type $Ty_{21}$ and a product specification $Sp_{21}$ of a yarn spindle product processed by the target workshop at the time $T_{21}$ in the second time period, $Y_{22}$ characteristic sequence and the second characteristic sequence to obtain the current parameter prediction result.

The target time sequence model may be a trained time sequence model, such as an Informer Model and an Autoregressive Integrated Moving Average Model.

After the first characteristic sequence and the second characteristic sequence are obtained, the first characteristic sequence and the second characteristic sequence can be input into the target time sequence model to obtain a characteristic processing result output from the target time sequence model, and the current parameter prediction result is obtained based on the characteristic processing result. As described above, the second characteristic sequence may be obtained based on the second initial sequence and the second additional characteristic, and the second initial sequence can be obtained by splicing an unknown parameter sequence on a known parameter sequence, so that after the characteristic processing result is obtained, an output sequence corresponding to the unknown parameter sequence in the characteristic processing result can be used as the current parameter prediction result.

Since the second characteristic sequence is constructed based on the historical parameter prediction result and the unknown parameter sequence, in the process of predicting the overall control parameter of the plurality of signal transmitters in the second time period by using the target time sequence model on the basis of the first characteristic sequence and the second characteristic sequence to obtain the current parameter prediction result, the historical parameter prediction result included in the second characteristic sequence plays a positive guiding role in the characteristic processing of the target time sequence model, thereby further improving the reliability of the current parameter prediction result.

Figure 3:
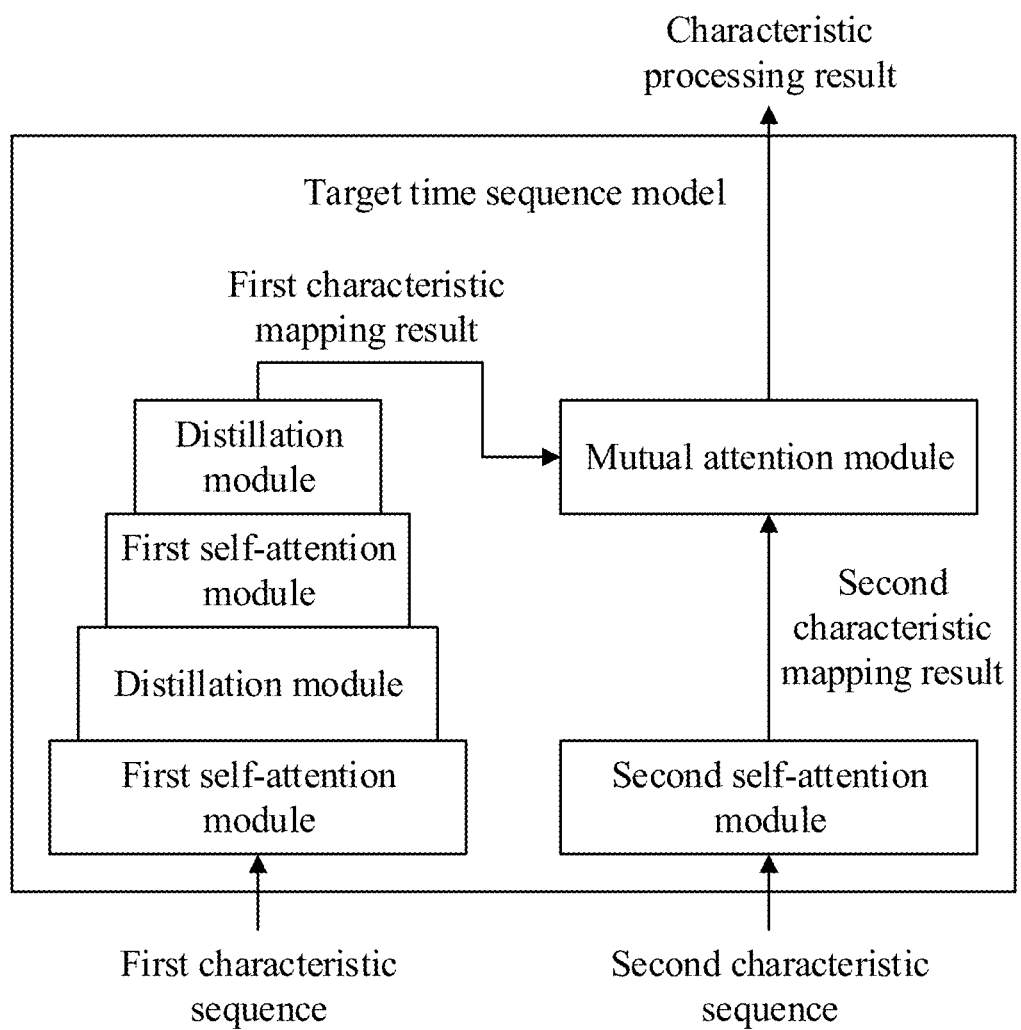
FIG. 3 is a schematic diagram illustrating a structure of a target timing model according to an embodiment of the present disclosure.

Further, in the embodiment of the present disclosure, the target time sequence model may have a model structure as shown in FIG. 3, that is, the target time sequence model may include an encoder and a decoder. Based on this, in an optional embodiment, Step S204 may include:

Step S204-1, the first characteristic sequence is inputted into the encoder, to process the first characteristic sequence by using a characteristic processing layer including a first self-attention module and a distillation module in the encoder to obtain a first characteristic mapping result.

The encoder can include a plurality of characteristic encoding structures that are connected in series, each of which includes a first self-attention module and a distillation module that are connected in series.

In addition, in the embodiment of the present disclosure, the first self-attention module is configured to implement self-attention calculation on an input characteristic by using a ProbSparse sparse self-attention mechanism to obtain an intermediate characteristic, input the intermediate characteristic into the distillation module that belongs to the same characteristic encoding structure as the first self-attention module, distill the intermediate characteristic through the distillation module to reduce complexity of an output characteristic, and use the distilled intermediate feature as the output characteristic of the characteristic encoding structure.

It can be understood that, in the embodiment of the present disclosure, the output characteristic of the last characteristic encoding structure in the plurality of characteristic encoding structures that are connected in series is the first characteristic mapping result.

Step S204-2, the second characteristic sequence is inputted into a second self-attention module in the encoder, to process the second characteristic sequence by using the second self-attention module to obtain a second characteristic mapping result.

The second self-attention module is configured to implement self-attention calculation on the second characteristic sequence by using a ProbSparse sparse self-attention mechanism and a mask mechanism to obtain the second characteristic mapping result.

Step S204-3, the first characteristic mapping result and the second characteristic mapping result are inputted into a mutual attention module in the encoder, to process the first characteristic mapping result and the second characteristic mapping result by using the mutual attention module to obtain a characteristic processing result.

The characteristic processing result includes the current parameter prediction result obtained by predicting the overall control parameter of the plurality of signal transmitters in the second time period.

Continuing with the previous example, the second characteristic sequence constructed based on the second initial sequence obtained by splicing the unknown parameter sequence on the known parameter sequence and the second additional characteristic obtained based on the real-time task information of the target workshop may include characteristic data as shown in Table 2. In this case, an output sequence corresponding to the unknown parameter sequence in the characteristic processing result may be used as the current parameter prediction result obtained by predicting the overall control parameter of the plurality of signal transmitters in the second time period. For example, the current parameter prediction result may include K inactive parameter subsequences corresponding to K signal transmitters one-to-one, and the inactive parameter subsequence corresponding to the $i^{th}$ signal transmitter in the K signal transmitters may be represented as $\{Z'i_{21}, Z'i_{22} \ldots Z'i_{2n}\}$, where $1 \leq i \leq K$, and i is a positive integer.

When i=1, $Z'1_{21}$ represents a parameter prediction value of the first signal transmitter in the K signal transmitters at time $T_{21}$ in the second time period, which may specifically include a frequency prediction value $F'1_{21}$, a phase prediction value $P'1_{21}$, an amplitude prediction value $A'1_{21}$, and a direction prediction value $D'1_{21}$, $Z'1_{22}$ represents a parameter prediction value of the first signal transmitter in the K signal transmitters at time $T_{22}$ in the second time period, which may specifically include a frequency prediction value $F'1_{22}$, a phase prediction value $P'1_{22}$, an amplitude prediction value $A'1_{22}$, and a direction prediction value $D'1_{22}$, and so on, $Z'1_{2n}$ represents a parameter prediction value of the first signal transmitter in the K signal transmitters at time $T_{2n}$ in the second time period, which may specifically include a frequency prediction value $F'1_{2n}$, a phase prediction value $P'1_{2n}$, an amplitude prediction value $A'1_{2n}$, and a direction prediction value $D'1_{2n}$.

That is, the current parameter prediction result can include the characteristic data as shown in Table 3:

TABLE 3

| Second Time Period | | | |
|---|---|---|---|
| $T_{21}$ | $T_{22}$ | ... | $T_{2n}$ |
| $Z'1_{21} = \{F'1_{21}, P'1_{21}, A'1_{21}, D'1_{21}\}$ | $Z'1_{22} = \{F'1_{22}, P'1_{22}, A'1_{22}, D'1_{22}\}$ | ... | $Z'1_{2n} = \{F'1_{2n}, P'1_{2n}, A'1_{2n}, D'1_{2n}\}$ |
| $Z'2_{21} = \{F'2_{21}, P'2_{21}, A'2_{21}, D'2_{21}\}$ | $Z'2_{22} = \{F'2_{22}, P'2_{22}, A'2_{22}, D'2_{22}\}$ | ... | $Z'2_{2n} = \{F'2_{2n}, P'2_{2n}, A'2_{2n}, D'2_{2n}\}$ |
| ... | ... | ... | ... |
| $Z'K_{21} = \{F'K_{21}, P'K_{21}, A'K_{21}, D'K_{21}\}$ | $Z'K_{22} = \{F'K_{22}, P'K_{22}, A'K_{22}, D'K_{22}\}$ | ... | $Z'K_{2n} = \{F'K_{2n}, P'K_{2n}, A'K_{2n}, D'K_{2n}\}$ |

Based on the model structure of the target time sequence model, the current parameter prediction result can be obtained quickly, thereby further improving the reliability of the current parameter prediction result.

Step S205, based on the current parameter prediction result, one or more target transmitters that need to start working in the second time period are determined from the plurality of signal transmitters, and a parameter prediction value of each target transmitter in the second time period is obtained.

Since the current parameter prediction result can be used to control the working state of each signal transmitter in the second time period, it can be determined, for each signal transmitter, whether the signal transmitter is a target transmitter that needs to work in the second time period based on the current parameter prediction result, and the parameter prediction value of each target transmitter in the second time period can be obtained. The parameter prediction value can include a frequency prediction value, a phase prediction value, an amplitude prediction value and a direction prediction value.

In an example, for each signal transmitter, if the frequency prediction value in the parameter prediction value of the signal transmitter is 0 at a certain time in the second time period, the signal transmitter can be used as an idleable transmitter which does not need to start working at the certain time in the second time period, or otherwise, the signal transmitter can be used as a target transmitter which needs to start working at the certain time in the second time period. For example, for the first signal transmitter in the K signal transmitters, if a frequency prediction value $F'1_{21}$ of the parameter prediction value of the first signal transmitter is 0 at time $T_{21}$ in the second time period, the first signal transmitter may be used as an idleable transmitter that does not need to start working at time $T_{21}$ in the second time period; for another example, if the frequency prediction value $F'1_{21}$ of the parameter prediction value of the first signal transmitter is not 0 at time $T_{22}$ in the second time period, the first signal transmitter may be used as a target transmitter that needs to start working at time $T_{22}$ in the second time period, and the parameter prediction value of the first signal transmitter at time $T_{22}$ in the second time period includes a frequency prediction value $F'1_{22}$, a phase prediction value $P'1_{22}$, an amplitude prediction value $A'1_{22}$, and a direction prediction value $D'1_{22}$.

Step S206, each target transmitter is controlled to transmit a noise interference signal in the second time period according to a corresponding parameter prediction value so as to weaken a second noise signal at the position of the target person in the target workshop in the second time period.

The second noise signal may be a real-time noise signal that is perceptible to the target person in the second time period.

After each target transmitter is controlled to transmit the noise interference signal in the second time period according to the corresponding parameter prediction value, the noise interference signal can generate an offset effect on the second noise signal at the position of the target person in the target workshop in the second time period, thereby weakening the second noise signal at the position of the target person in the target workshop in the second time period.

In addition, it should be noted that, in the embodiment of the present disclosure, after Step S201 is executed to obtain the first noise signal at the position of the target person in the target workshop in the first time period, Steps S201 to S206 may be executed only when a signal intensity of the first noise signal is lower than a preset intensity threshold; in the case that the signal intensity of the first noise signal is greater than or equal to the preset intensity threshold, the historical parameter prediction result can be directly used as the current parameter prediction result.

It should be further noted that, in the embodiment of the present disclosure, before executing the noise processing method, a time sequence model may be trained to obtain the target time sequence model by:

obtaining a third noise signal at the position of the target person in a designated workshop in a third time period, wherein the designated workshop is any one of the plurality of functionally different production workshops related to a spinning process, and the target person is an operator who enters the target workshop;

predicting an overall control parameter of the plurality of signal transmitters arranged in the target workshop in a fourth time period by using a time sequence model based on a third noise signal to obtain a current training parameter prediction result, wherein the fourth time period is a future time period of the third time period;

determining one or more pre-selected transmitters that need to work in the fourth time period from the plurality of signal transmitters based on the current training parameter prediction result, and obtaining a training parameter prediction value of each pre-selected transmitter in the fourth training time period;

controlling each pre-selected transmitter to transmit the noise interference signal in the fourth time period according to a corresponding training parameter prediction value; and optimizing a model parameter of the time sequence model based on a difference between the second noise signal and an ideal noise signal at the position of the target person in the designated workshop in the fourth time period, wherein the ideal noise signal is set according to an application requirement.

The above contents can be understood with reference to the foregoing related contents and will not be described herein again.

In addition, it should be noted that, in the embodiment of the disclosure, when the difference between the second noise signal and the ideal noise signal satisfies a preset difference requirement, the latest time sequence model may be used as the target time sequence module.

In some optional embodiments, before Step 102 or Step 202 is executed, the noise processing method may further include:

eliminating an abnormal signal from the first noise signal to obtain a new first noise signal.

Herein the abnormal signal may be other noise signals other than a noise signal generated when the process equipment unit in the target workshop works. For example, the abnormal signal may be a voice signal produced from loud talking of a worker in the target workshop, or a noise signal produced from a worker touching the process equipment unit.

Based on this, when Step S102 is executed, the overall control parameter of the plurality of signal transmitters in the second time period may be predicted based on the new first noise signal, so as to obtain the current parameter prediction result; when Step 202 is executed, the first characteristic sequence is constructed based on the new first noise signal and the historical parameter prediction results, such that subsequent steps of the noise processing method are performed based on the first characteristic sequence.

Since the new first noise signal is obtained by eliminating the abnormal signal in the first noise signal, the interference of the abnormal signal can be avoided when the subsequent steps of the noise processing method are executed based on the new first noise signal, thereby improving the reliability of the current parameter prediction result.

In one example, the "eliminating an abnormal signal from the first noise signal to obtain the new first noise signal" may include:

performing a wavelet packet transformation on the first noise signal to obtain a plurality of initial wavelet packet coefficients;

performing a threshold processing on each of the plurality of initial wavelet packet coefficients to obtain a plurality of target wavelet packet coefficients corresponding one-to-one to the plurality of initial wavelet packet coefficients; and performing a reverse wavelet packet transformation on the plurality of target wavelet packet coefficients to obtain the new first noise signal.

Figure 4:
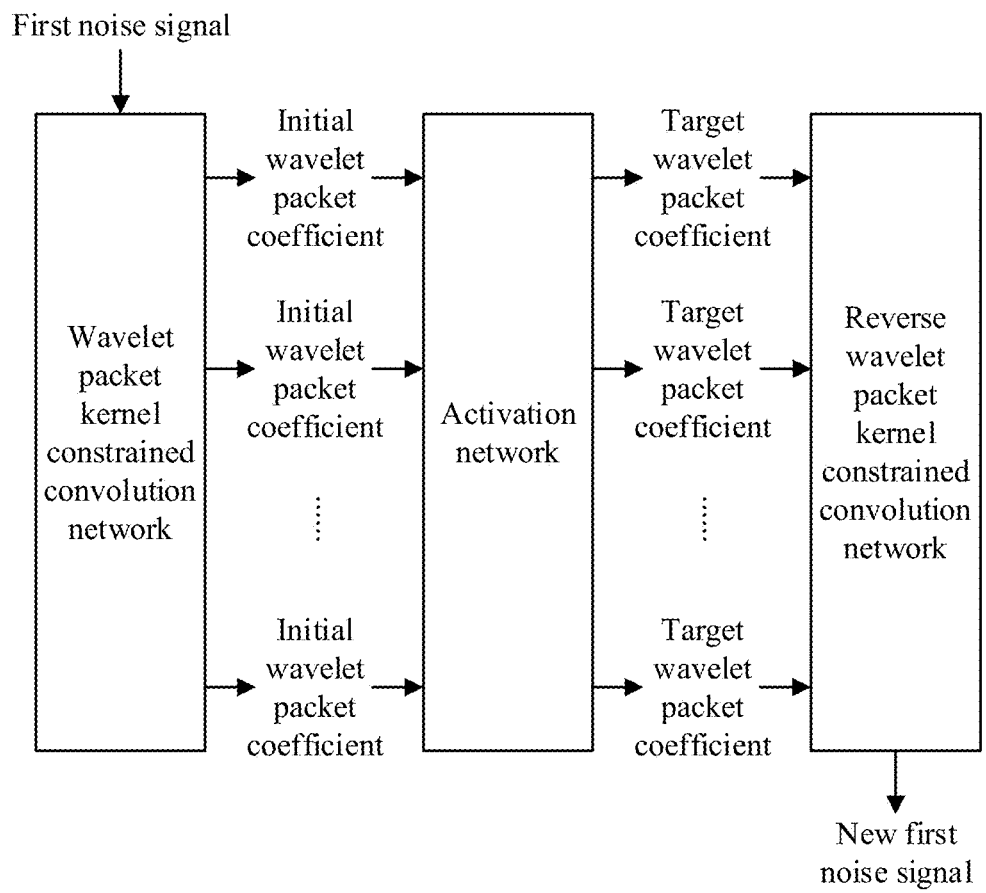
FIG. 4 is an explanatory diagram illustrating a process of rejecting an abnormal signal according to an embodiment of the disclosure.

Referring to FIG. 4, in a specific example, the wavelet packet transformation may be performed on the first noise signal by using a wavelet packet kernel constrained convolutional network to obtain the plurality of initial wavelet packet coefficients. When wavelet packet transformation is performed on the first noise signal, a preset multi-channel wavelet regular term can be used as a transformation constraint condition of a filter in the wavelet packet kernel constrained convolution network to decompose the first noise signal, so that the plurality of initial wavelet packet coefficients are obtained. Herein, the multi-channel wavelet regular term can be expressed as:

$$R_{m-wave} = \frac{1}{C}\sum_c R_{wave}$$
$$R_{wave} = \left|\sum_p h_p^2 - 1\right| + \sum_u \left|\sum_p h_p h_{p+2u}\right| + \left|\sum_p h_p - \sqrt{2}\right|,$$

where c represents a channel of a filter h in the wavelet packet kernel constrained convolutional network, C represents the number of the channels of the filter h in the wavelet packet kernel constrained convolutional network, $R_{wave}$ represents a single-channel wavelet regular term, p represents the number of the filters h, and u represents an order of the filter h.

After the plurality of initial wavelet packet coefficients are obtained, an activation network may be used to perform the threshold processing on each of the plurality of initial wavelet packet coefficients to obtain the plurality of target wavelet packet coefficients corresponding one-to-one to the plurality of initial wavelet packet coefficients. For each initial wavelet packet coefficient, the threshold processing is performed on the initial wavelet packet coefficient by a preset soft-shrink function in the activation network to obtain a target wavelet packet coefficient corresponding to the initial wavelet packet coefficient. The soft-shrink function can be expressed as:

$$\text{Softshrink}(x) = \begin{cases} x - \delta, & x > \delta \\ 0, & |x| < \delta \\ x + \delta, & x < -\delta \end{cases}$$
$$\delta = \beta\sigma\,(x)$$
$$\beta = \text{sigmoid}\,(\lambda),$$

where $\lambda$ represents a learnable parameter, sigmoid ($\lambda$) represents that $\lambda$ is processed by a sigmoid function, $\sigma$ represents standard deviation operation, and x represents an initial wavelet packet coefficient for the threshold processing.

After the plurality of target wavelet packet coefficients corresponding one-to-one to the plurality of initial wavelet packet coefficients are obtained, the reverse wavelet packet transformation can be performed on the plurality of target wavelet packet coefficients by using a reverse wavelet packet kernel constrained convolution network to complete reconstruction of the noise signal, so that the new first noise signal is obtained.

As such, in the embodiment of the present disclosure, an improved wavelet packet denoising technology may be used to remove abnormal signals from the first noise signal to obtain the new first noise signal. Since the improved wavelet packet denoising technology has a superior abnormal signal rejection effect, the interference of the abnormal signal can be avoided to the maximum extent, thereby further improving the reliability of the current parameter prediction result.

Furthermore, in the embodiment of the present disclosure, the wavelet packet kernel constrained convolution network, the activation network, and the reverse wavelet packet kernel constrained convolution network that are connected in series may be used as an abnormal signal processing network, an abnormal signal processing model is obtained by connecting a plurality of abnormal signal processing networks in series, and then the abnormal signal is removed from the first noise signal by using the abnormal signal processing model to obtain the new first noise signal, thereby further improving the reliability of the current parameter prediction result.

Further, as previously described, in the embodiment of the present disclosure, the arrangement of the plurality of signal transmitters in the target workshop is correlated to the real-time noise sound field within the target workshop. Based on this, in an optional embodiment, before Step S101 or Step S201 is executed, the noise processing method may further include:

selecting a plurality of strong noise points with the loudest noise from the target workshop based on the real-time noise sound field in the target workshop;

selecting a plurality of target points corresponding one-to-one to the plurality of strong noise points from a top of the target workshop; and adjusting the arrangement mode of the plurality of signal transmitters in the target workshop so that the plurality of signal transmitters are arranged at the plurality of target points in one-to-one correspondence.

Herein, the real-time noise sound field in the target workshop can be obtained by means of an indoor acoustic simulation.

In one example, the target workshop may first be modeled in acoustic simulation software according to workshop features of the target workshop, so as to obtain a workshop model of the target workshop.

Herein, the acoustic simulation software can be COMSOL multi-physical field simulation software; the workshop features may include house features, which may include house structure, house size, building materials as used, for example, and equipment features of the process equipment units, which may include the number of installations and arrangement of process equipment units, and equipment structure, equipment size, manufacturing materials of the process equipment units, for example. Based on this, the workshop model may include, in this example, a house model, and an equipment model of the process equipment unit. Further, in this example, house modelling may be performed according to the house features of the target workshop to obtain a house model of the target workshop, equipment modelling may be performed according to the equipment features of the process equipment unit in the target workshop to obtain an equipment model of the process equipment unit in the target workshop, and a sound simulator may be added to each equipment model.

Then, a first simulation parameter can be obtained based on the real-time task information of the target workshop, and a sound simulator added in each equipment model in the workshop model of the target workshop is controlled in acoustic simulation software to transmit a noise simulation signal according to the first simulation parameter, so that a real-time noise sound field in the target workshop is obtained.

The real-time task information can include a product type and a product specification of a yarn spindle product processed in the target workshop, and based on the real-time task information, working parameters of the process equipment units in the target workshop when working can be obtained. Based on this, in this example, the working parameters used by the process equipment unit in the target workshop when working can be obtained based on the real-time task information of the target workshop, any process equipment unit in the target workshop is selected as a test equipment unit, and then the test equipment unit is controlled to start working based on the working parameters. In the meanwhile, a second sound pickup arranged near the test equipment unit can be used for collecting the real-time noise signal emitted from the test equipment unit when working, and analyzing the real-time noise signal to obtain the first simulation parameter, so as to control the sound simulator to transmit a noise simulation signal which is identical to the real-time noise signal (for example, all frequency value, phase value, amplitude value and direction value are identical). When the process equipment unit is a spinning manifold, the working parameter used by the process equipment unit when working can include a specification parameter of a spinneret plate in the spinning manifold and a spinning speed, for example; when the process equipment unit is a winding machine, the working parameter used by the process equipment unit when working can include a brand, a specification parameter, a winding speed and the number of winding heads of the winding machine, for example; the second pickup may be an electromagnetic pickup, a piezoelectric pickup, a fiber pickup and a digital pickup, for example.

After the real-time noise sound field in the target workshop is obtained, a plurality of strong noise points with the loudest noise can be selected from the target workshop based on the real-time noise sound field in the target workshop, then a plurality of target points corresponding one-to-one to the plurality of strong noise points from a top of the target workshop are selected from a top of the target workshop, and the arrangement mode of the plurality of signal transmitters in the target workshop is adjusted, so that the plurality of signal transmitters are arranged at the plurality of target points in one-to-one correspondence.

In one example, mounting racks for the signal transmitter are arranged at the top of the target workshop, the mounting rack includes a plurality of long-strip rails fixed at the top of the target workshop, and a plurality of movable tracks for mounting the signal transmitter are arranged between two adjacent long-strip rails. In response to a first movement control instruction, the movable track can move on the two long-strip rails corresponding to the movable track; in response to the second movement control instruction, the signal transmitter can in turn move on the movable track corresponding to the signal transmitter. Based on this, after the plurality of target points corresponding one-to-one to the plurality of strong noise points are selected from the top of the target workshop, the plurality of signal transmitters can be arranged at the plurality of target points in one-to-one correspondence by moving the movable track and/or the signal transmitter mounted on the movable track.

Figure 5:
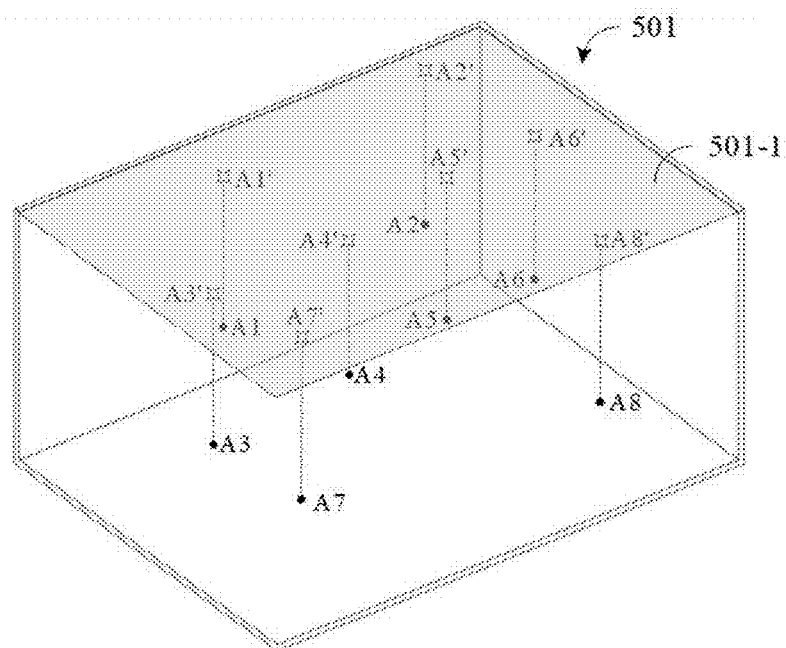
FIG. 5 is an explanatory diagram illustrating a selecting process of a target point location according to an embodiment of the present disclosure.

Referring to FIG. 5, exemplarily, based on the real-time noise sound field in the target workshop 501, 8 strong noise points with the loudest noise are selected from the target workshop 501, which are a strong noise point A1, a strong noise point A2, a strong noise point A3, a strong noise point A4, a strong noise point A5, a strong noise point A6, a strong noise point A7, and a strong noise point A8, respectively. Thereafter, 8 target points corresponding one-to-one to the plurality of strong noise points may be selected from the top 501-1 of the target workshop 501, which are a target point A1', a target point A2', a target point A3', a target point A4', a target point A5', a target point A6', a target point A7', and a target point A8', respectively.

Figure 6:
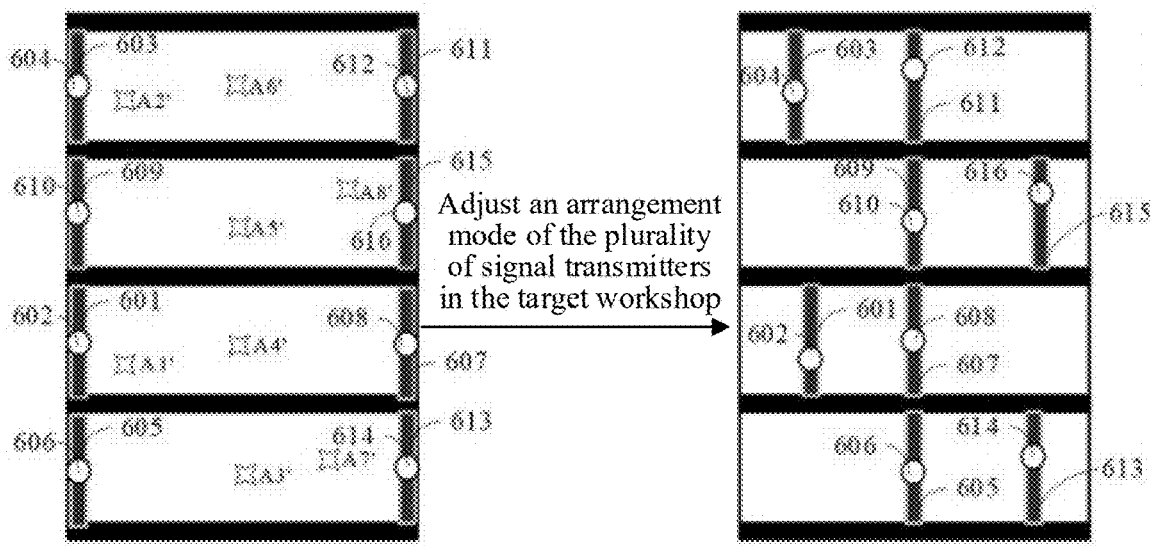
FIG. 6 is an explanatory diagram illustrating an adjusting process for an arrangement of signal transmitters (based on a top view angle of a target workshop) according to an embodiment of the disclosure.

Referring to FIG. 6, after the 8 target points corresponding one-to-one to the 8 strong noise points are selected from the top of the target workshop, a signal transmitter 602 may be disposed at the target point A1' by moving a movable track 601 and the signal transmitter 602 mounted on the movable track 601. In a similar way, a signal transmitter 604 may be disposed at the target point A2', a signal transmitter 606 may be disposed at the target point A3', a signal transmitter 608 may be disposed at the target point A4', a signal transmitter 610 may be disposed at the target point A5', a signal transmitter 612 may be disposed at the target point A6', a signal transmitter 614 may be disposed at the target point A7', and a signal transmitter 616 may be disposed at the target point A8'.

In the embodiment of the disclosure, on one hand, since the arrangement of the plurality of signal transmitters in the target workshop is automatically adjusted, the automation degree of the noise processing method can be improved; on the other hand, since the plurality of target points are in one-to-one correspondence with the plurality of strong noise points with the loudest noise in the target workshop, after the plurality of signal transmitters are arranged at the plurality of target points in one-to-one correspondence, the noise interference signal transmitted by each target transmitter in the second time period according to the corresponding parameter prediction value can generate a better offset effect on the second noise signal at the position of the target person in the target workshop in the second time period.

In order to better implement the above noise processing method, an embodiment of the present disclosure also provides a noise processing apparatus, which may be applied to an electronic device, the electronic device being in communication with a plurality of signal transmitters arranged in a target workshop and an arrangement of the plurality of signal transmitters in the target workshop having a correspondence relation with a real-time noise sound field in the target workshop.

Figure 7:
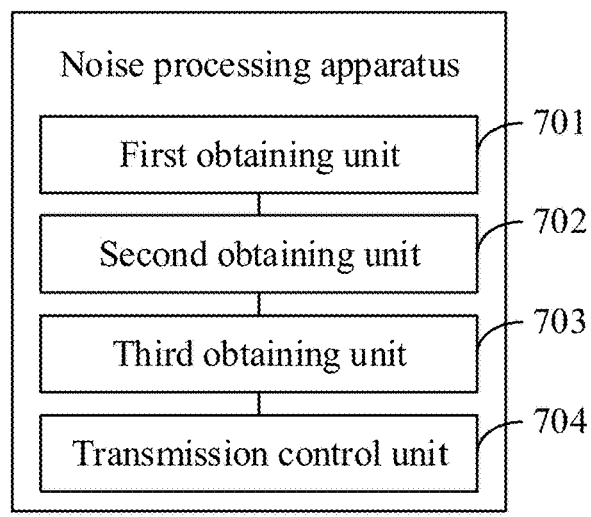
FIG. 7 is a block diagram of a noise processing apparatus according to an embodiment of the present disclosure.

Hereinafter, a noise processing apparatus according to an embodiment of the present disclosure will be described with reference to a block diagram shown in FIG. 7.

A noise processing apparatus includes:
- a first obtaining unit 701, configured to obtain a first noise signal at a position of a target person in a target workshop in a first time period;
- a second obtaining unit 702, configured to predict, based on the first noise signal, an overall control parameter of a plurality of signal transmitters in a second time period to obtain a current parameter prediction result, wherein the second time period is a future time period of the first time period;
- a third obtaining unit 703, configured to determine, based on the current parameter prediction result, one or more target transmitters that need to start working in the second time period from the plurality of signal transmitters, and obtain a parameter prediction value of each target transmitter in the second time period; and
- a transmission control unit 704, configured to control each target transmitter to transmit a noise interference signal in the second time period according to a corresponding parameter prediction value to weaken a second noise signal at the position of the target person in the target workshop in the second time period, wherein the second time period is a future time period of the first time period.

In an optional implementation, the second obtaining unit 702 is configured to:
  construct a first characteristic sequence based on the first noise signal and on a historical parameter prediction result, wherein the historical parameter prediction result is obtained by predicting the overall control parameter of the plurality of signal transmitters in the first time period based on a zeroth noise signal at the position of the target person in the target workshop in a zeroth time period, wherein the zeroth time period is a history time period of the first time period;
  construct a second characteristic sequence based on the historical parameter prediction result and on an unknown parameter sequence, wherein the unknown parameter sequence is an input sequence corresponding to the current parameter prediction result; and
  predict the overall control parameter of the plurality of signal transmitters in the second time period by using a target time sequence model based on the first characteristic sequence and the second characteristic sequence to obtain the current parameter prediction result.

In an optional implementation, the second obtaining unit 702 is configured to:
  obtain a noise signal sequence arranged according to a time sequence based on the first noise signal;
  obtain a known parameter sequence arranged according to the time sequence based on the historical parameter prediction result;
  splice the known parameter sequence on the noise signal sequence to obtain a first initial sequence;
  obtain a first additional characteristic based on real-time task information of the target workshop; and
  construct a first characteristic sequence based on the first initial sequence and the first additional characteristic.

In an optional implementation, the second obtaining unit 702 is configured to:
  obtain the known parameter sequence arranged according to the time sequence based on the historical parameter prediction result;
  splice the unknown parameter sequence on the known parameter sequence to obtain a second initial sequence;
  obtain a second additional characteristic based on the real-time task information of the target workshop; and
  construct a second characteristic sequence based on the second initial sequence and the second additional characteristic.

In an optional implementation, the target time sequence model includes an encoder and a decoder; the second obtaining unit 702 is configured to:
  input the first characteristic sequence into the encoder, to process the first characteristic sequence by using a characteristic processing layer including a first self-attention module and a distillation module in the encoder to obtain a first characteristic mapping result;
  input the second characteristic sequence into a second self-attention module in the encoder, to process the second characteristic sequence by using the second self-attention module to obtain a second characteristic mapping result; and
  input the first characteristic mapping result and the second characteristic mapping result into a mutual attention module in the encoder, to process the first characteristic mapping result and the second characteristic mapping result by using the mutual attention module to obtain a characteristic processing result, wherein the characteristic processing result includes the current parameter prediction result obtained by predicting the overall control parameter of the plurality of signal transmitters in the second time period.

In an optional implementation, the noise processing apparatus further includes a denoising unit, configured to:
  eliminate an abnormal signal from the first noise signal to obtain a new first noise signal;
  wherein obtaining the current parameter prediction result of the plurality of signal transmitters in the second time period based on the first noise signal includes:
  predicting the overall control parameter of the plurality of signal transmitters in the second time period based on the new first noise signal to obtain the current parameter prediction result.

In an optional implementation, the denoising unit is configured to:
  perform a wavelet packet transformation on the first noise signal to obtain a plurality of initial wavelet packet coefficients;
  perform a threshold processing on each of the plurality of initial wavelet packet coefficients to obtain a plurality of target wavelet packet coefficients corresponding one-to-one to the plurality of initial wavelet packet coefficients; and
  perform a reverse wavelet packet transformation on the plurality of target wavelet packet coefficients to obtain the new first noise signal.

In an optional implementation, the noise processing apparatus further includes a transmission head arrangement unit, configured to:
  select a plurality of strong noise points with the loudest noise from the target workshop based on the real-time noise sound field in the target workshop;
  select a plurality of target points corresponding one-to-one to the plurality of strong noise points from a top of the target workshop; and
  adjust the arrangement mode of the plurality of signal transmitters in the target workshop so that the plurality of signal transmitters are arranged at the plurality of target points in one-to-one correspondence.

For a description of specific functions and examples of each module and each sub-module of the apparatus in the embodiment of the present disclosure, reference may be made to the related description of the corresponding steps in the foregoing method embodiments, and details thereof will not be repeated herein.

In the technical scheme of the disclosure, the acquisition, storage, and application of related user's personal information comply with relevant laws and regulations and do not contravene public order and good morals.

Figure 8:
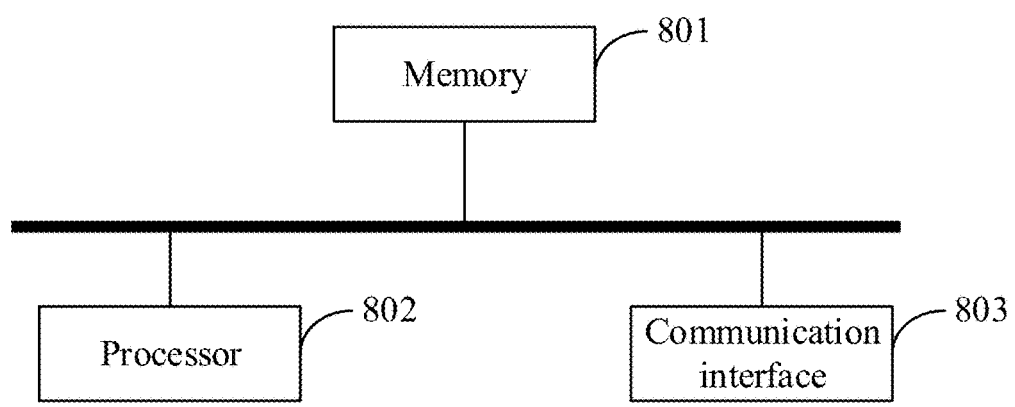
FIG. 8 is a block diagram of an electronic device according to an embodiment of the present disclosure.

FIG. 8 is a block diagram of an electronic device according to an embodiment of the present disclosure. As shown in FIG. 8, the electronic device includes: a memory 801 and a processor 802, the memory 801 storing therein a computer program operable on the processor 802. The number of the memory 801 and the processor 802 may be one or more. The memory 801 may store one or more computer programs that, when executed by the electronic device, cause the electronic device to perform the methods according to the above-described method embodiments. The electronic device may further include: the communication interface 803 is used for communicating with an external device to perform data interactive transmission.

If the memory 801, the processor 802, and the communication interface 803 are implemented independently, the memory 801, the processor 802, and the communication interface 803 may connect to and communicate with each other through a bus. The bus may be an Industry Standard Architecture (ISA) bus, a Peripheral Component Interconnect (PCI) bus, an Extended Industry Standard Architecture (EISA) bus, or the like. The bus may be divided into an address bus, a data bus, a control bus, for example. For sake of illustration, the bus is represented by only one thick line in FIG. 8, but it does not mean only one bus or one type of bus is provided.

Optionally, in a specific implementation, if the memory 801, the processor 802, and the communication interface 803 are integrated on a chip, the memory 801, the processor 802, and the communication interface 803 may communicate with each other through an internal interface.

It should be understood that the processor may be a Central Processing Unit (CPU) or other general-purpose processor, a Digital Signal Processing (DSP), an Application Specific Integrated Circuit (ASIC), a Field Programmable Gate Array (FPGA) or other programmable logic device, discrete gate or transistor logic device or discrete hardware components, for example. The general-purpose processor may be a microprocessor or any conventional processor. It is noted that the processor may be a processor supporting Advanced RISC Machine (ARM) architecture.

Further, optionally, the memory may include a read-only memory and a random-access memory, and may further include a nonvolatile random-access memory. The memory may be a volatile memory or a nonvolatile memory, or may include both the volatile and the nonvolatile memory. The non-volatile memory may include a Read-Only Memory (ROM), a Programmable ROM (PROM), an Erasable PROM (EPROM), an Electrically EPROM (EEPROM), or a flash Memory. The volatile memory may include a Random-Access Memory (RAM), which acts as an external cache memory. By way of example and not limitation, many forms of RAM are available, such as Static RAM (SRAM), Dynamic Random-Access Memory (DRAM), Synchronous DRAM (SDRAM), Double Data Rate SDRAM (DDR SDRAM), Enhanced SDRAM (ESDRAM), Synchlink DRAM (SLDRAM), and Direct RAMBUS RAM (DR RAM).

The above embodiments may be implemented in whole or in part by software, hardware, firmware, or any combination thereof. When implemented in software, they may be implemented in whole or in part in the form of a computer program product. The computer program product includes one or more computer instruction. The computer instruction, when loaded and executed on a computer, can all or partially generate the flows or functions described in accordance with the embodiments of the disclosure. The computer may be a general-purpose computer, a special purpose computer, a network of computers, or other programmable devices. The computer instruction can be stored in a computer-readable storage medium or transmitted from one computer-readable storage medium to another computer-readable storage medium. For example, the computer instruction can be transmitted from one website, computer, server, or data center to another website, computer, server, or data center via wire (e.g., coaxial cable, fiber optic or Digital Subscriber Line (DSL)) or wireless (e.g., infrared, Bluetooth of microwave). The computer-readable storage medium can be any available medium that can be accessed by a computer or a data storage device, such as a server and a data center, that includes one or more available medium integration. The available medium may be a magnetic medium (e.g., floppy Disk, hard Disk, magnetic tape), an optical medium (e.g., Digital Versatile Disk (DVD)), or a semiconductor medium (e.g., Solid State Disk (SSD)), for example. It should be noted that the computer-readable storage medium referred to in the disclosure can be non-volatile storage medium, i.e., non-transitory storage medium.

It will be understood by those skilled in the art that all or part of the steps for performing the above embodiments may be implemented by hardware, or may be implemented by a program instructing relevant hardware, where the program may be stored in a computer-readable storage medium, and the storage medium may be a read-only memory, a magnetic disk or an optical disk.

In the description of the embodiments of the present disclosure, the description with reference to the terms such as "one embodiment", "some embodiments", "an example", "a specific example" or "some examples" means that a particular feature, structure, material, or characteristic described in connection with the embodiment or example is included in at least one embodiment or example of the present disclosure. Furthermore, the particular features, structures, materials, or characteristics described may be combined in any suitable manner in any one or more embodiments or examples. Moreover, various embodiments or examples and features in various embodiments or examples described in this specification can be combined and grouped by one skilled in the art if there is no mutual conflict.

In the description of the embodiments of the present disclosure, the sign "/" indicates a meaning of "or", for example, A/B indicates a meaning of A or B, unless otherwise specified. The term "and/or" herein is merely an association relationship describing associated objects, and means that there may be three relationships, for example, A and/or B may mean: A alone, both A and B, and B alone.

In the description of the embodiments of the present disclosure, the terms "first", "second" and "third" are used for descriptive purposes only and should not be construed as indicating or implying relative importance or implicitly indicating the number of technical features as indicated. Thus, a feature defined as "first", "second" or "third" may explicitly or implicitly include one or more features. In the description of the embodiments of the present disclosure, "a plurality" means two or more unless otherwise specified.

The above description is intended only to illustrate embodiments of the present disclosure, and should not be taken as limiting thereof, and any modifications, equivalents and improvements made within the spirit and principle of the present disclosure will fall within the scope of the present disclosure.

What is claimed is:

1. A noise processing method applied to an electronic device, the electronic device being communicated with a plurality of signal transmitters arranged in a target workshop, an arrangement mode of the plurality of signal transmitters in the target workshop being related to a real-time noise sound field in the target workshop, and the method comprising:

obtaining a first noise signal at a position of a target person in the target workshop in a first time period;

predicting an overall control parameter of the plurality of signal transmitters in a second time period based on the first noise signal to obtain a current parameter prediction result, wherein the second time period is a future time period of the first time period;

determining one or more target transmitters that need to work in the second time period from the plurality of signal transmitters based on the current parameter prediction result, and obtaining a parameter prediction value of each target transmitter in the second time period; and controlling each target transmitter to transmit a noise interference signal in the second time period according to a corresponding parameter prediction value to weaken a second noise signal at the position of the target person in the target workshop in the second time period;

wherein the predicting the overall control parameter of the plurality of signal transmitters in the second time period based on the first noise signal to obtain the current parameter prediction result comprises:

constructing a first characteristic sequence based on the first noise signal and on a historical parameter prediction result, wherein the historical parameter prediction result is obtained by predicting the overall control parameter of the plurality of signal transmitters in the first time period based on a zeroth noise signal at the position of the target person in the target workshop in a zeroth time period, wherein the zeroth time period is a history time period of the first time period;

constructing a second characteristic sequence based on a historical parameter prediction result and on an unknown parameter sequence, wherein the unknown parameter sequence is an input sequence corresponding to the current parameter prediction result; and predicting the overall control parameter of the plurality of signal transmitters in the second time period by using a target time sequence model based on the first characteristic sequence and the second characteristic sequence, to obtain the current parameter prediction result.

2. The method of claim 1, wherein the constructing the first characteristic sequence based on the first noise signal and on the historical parameter prediction result comprises:

obtaining a noise signal sequence arranged according to a time sequence based on the first noise signal;

obtaining a known parameter sequence arranged according to the time sequence based on the historical parameter prediction result;

splicing the known parameter sequence on the noise signal sequence to obtain a first initial sequence;

obtaining a first additional characteristic based on real-time task information of the target workshop; and constructing the first characteristic sequence based on the first initial sequence and the first additional characteristic.

3. The method of claim 1, wherein the constructing the second characteristic sequence based on the historical parameter prediction result and on the unknown parameter sequence comprises:

obtaining the known parameter sequence arranged according to the time sequence based on the historical parameter prediction result;

splicing the unknown parameter sequence on the known parameter sequence to obtain a second initial sequence;

obtaining a second additional characteristic based on the real-time task information of the target workshop; and constructing the second characteristic sequence based on the second initial sequence and the second additional characteristic.

4. The method of claim 1, wherein the target time sequence model comprises an encoder and a decoder; and the predicting the overall control parameter of the plurality of signal transmitters in the second time period by using the target time sequence model based on the first characteristic sequence and the second characteristic sequence to obtain the current parameter prediction result comprises:

inputting the first characteristic sequence into the encoder, to process the first characteristic sequence by using a characteristic processing layer including a first self-attention module and a distillation module in the encoder to obtain a first characteristic mapping result;

inputting the second characteristic sequence into a second self-attention module in the encoder, to process the second characteristic sequence by using the second self-attention module to obtain a second characteristic mapping result; and inputting the first characteristic mapping result and the second characteristic mapping result into a mutual attention module in the encoder, to process the first characteristic mapping result and the second characteristic mapping result by using the mutual attention module to obtain a characteristic processing result, wherein the characteristic processing result includes the current parameter prediction result obtained by predicting the overall control parameter of the plurality of signal transmitters in the second time period.

5. The method of claim 1, further comprising:

eliminating an abnormal signal from the first noise signal to obtain a new first noise signal, wherein the obtaining current parameter prediction result of the plurality of signal transmitters in the second time period based on the first noise signal comprises:

predicting the overall control parameter of the plurality of signal transmitters in the second time period based on the new first noise signal, to obtain the current parameter prediction result.

6. The method of claim 5, wherein the eliminating the abnormal signal from the first noise signal to obtain the new first noise signal comprises:

performing a wavelet packet transformation on the first noise signal to obtain a plurality of initial wavelet packet coefficients;

performing a threshold processing on each of the plurality of initial wavelet packet coefficients to obtain a plurality of target wavelet packet coefficients corresponding one-to-one to the plurality of initial wavelet packet coefficients; and performing a reverse wavelet packet transformation on the plurality of target wavelet packet coefficients to obtain the new first noise signal.

7. The method of claim 1, further comprising:

selecting a plurality of strong noise points with the loudest noise from the target workshop based on the real-time noise sound field in the target workshop;

selecting a plurality of target points corresponding one-to-one to the plurality of strong noise points from a top of the target workshop; and adjusting the arrangement mode of the plurality of signal transmitters in the target workshop so that the plurality of signal transmitters are arranged at the plurality of target points in one-to-one correspondence.

8. An electronic device, communicated with a plurality of signal transmitters arranged in a target workshop, an arrangement mode of the plurality of signal transmitters in the target workshop being related to a real-time noise sound field in the target workshop, comprising:

at least one processor; and a memory connected in communication with the at least one processor;

wherein the memory stores an instruction executable by the at least one processor, and the instruction, when executed by the at least one processor, enables the at least one processor to execute following operations:

obtaining a first noise signal at a position of a target person in the target workshop in a first time period;

predicting an overall control parameter of the plurality of signal transmitters in a second time period based on the first noise signal to obtain a current parameter prediction result, wherein the second time period is a future time period of the first time period;

determining one or more target transmitters that need to work in the second time period from the plurality of signal transmitters based on the current parameter prediction result, and obtaining a parameter prediction value of each target transmitter in the second time period; and controlling each target transmitter to transmit a noise interference signal in the second time period according to a corresponding parameter prediction value to weaken a second noise signal at the position of the target person in the target workshop in the second time period;

wherein the predicting the overall control parameter of the plurality of signal transmitters in the second time period based on the first noise signal to obtain the current parameter prediction result comprises:

constructing a first characteristic sequence based on the first noise signal and on a historical parameter prediction result, wherein the historical parameter prediction result is obtained by predicting the overall control parameter of the plurality of signal transmitters in the first time period based on a zeroth noise signal at the position of the target person in the target workshop in a zeroth time period, wherein the zeroth time period is a history time period of the first time period;

constructing a second characteristic sequence based on a historical parameter prediction result and on an unknown parameter sequence, wherein the unknown parameter sequence is an input sequence corresponding to the current parameter prediction result; and predicting the overall control parameter of the plurality of signal transmitters in the second time period by using a target time sequence model based on the first characteristic sequence and the second characteristic sequence, to obtain the current parameter prediction result.

9. The electronic device of claim 8, wherein the constructing the first characteristic sequence based on the first noise signal and on the historical parameter prediction result comprises:

obtaining a noise signal sequence arranged according to a time sequence based on the first noise signal;

obtaining a known parameter sequence arranged according to the time sequence based on the historical parameter prediction result;

splicing the known parameter sequence on the noise signal sequence to obtain a first initial sequence;

obtaining a first additional characteristic based on real-time task information of the target workshop; and constructing the first characteristic sequence based on the first initial sequence and the first additional characteristic.

10. The electronic device of claim 8, wherein the constructing the second characteristic sequence based on the historical parameter prediction result and on the unknown parameter sequence comprises:

obtaining the known parameter sequence arranged according to the time sequence based on the historical parameter prediction result;

splicing the unknown parameter sequence on the known parameter sequence to obtain a second initial sequence;

obtaining a second additional characteristic based on the real-time task information of the target workshop; and constructing the second characteristic sequence based on the second initial sequence and the second additional characteristic.

11. The electronic device of claim 8, wherein the target time sequence model comprises an encoder and a decoder; and the predicting the overall control parameter of the plurality of signal transmitters in the second time period by using the target time sequence model based on the first characteristic sequence and the second characteristic sequence to obtain the current parameter prediction result comprises:

inputting the first characteristic sequence into the encoder, to process the first characteristic sequence by using a characteristic processing layer including a first self-attention module and a distillation module in the encoder to obtain a first characteristic mapping result;

inputting the second characteristic sequence into a second self-attention module in the encoder, to process the second characteristic sequence by using the second self-attention module to obtain a second characteristic mapping result; and inputting the first characteristic mapping result and the second characteristic mapping result into a mutual attention module in the encoder, to process the first characteristic mapping result and the second characteristic mapping result by using the mutual attention module to obtain a characteristic processing result, wherein the characteristic processing result includes the current parameter prediction result obtained by predicting the overall control parameter of the plurality of signal transmitters in the second time period.

12. The electronic device of claim 8, wherein the operations further comprise:

eliminating an abnormal signal from the first noise signal to obtain a new first noise signal, wherein the obtaining current parameter prediction result of the plurality of signal transmitters in the second time period based on the first noise signal comprises:

predicting the overall control parameter of the plurality of signal transmitters in the second time period based on the new first noise signal, to obtain the current parameter prediction result.

13. A non-transitory computer-readable storage medium storing a computer instruction thereon, wherein the computer instruction is used to cause a computer communicated with a plurality of signal transmitters arranged in a target workshop, an arrangement mode of the plurality of signal transmitters in the target workshop being related to a real-time noise sound field in the target workshop, to execute following operations:

obtaining a first noise signal at a position of a target person in the target workshop in a first time period;

predicting an overall control parameter of the plurality of signal transmitters in a second time period based on the first noise signal to obtain a current parameter prediction result, wherein the second time period is a future time period of the first time period;

determining one or more target transmitters that need to work in the second time period from the plurality of signal transmitters based on the current parameter prediction result, and obtaining a parameter prediction value of each target transmitter in the second time period; and controlling each target transmitter to transmit a noise interference signal in the second time period according to a corresponding parameter prediction value to weaken a second noise signal at the position of the target person in the target workshop in the second time period;

wherein the predicting the overall control parameter of the plurality of signal transmitters in the second time period based on the first noise signal to obtain the current parameter prediction result comprises:

constructing a first characteristic sequence based on the first noise signal and on a historical parameter prediction result, wherein the historical parameter prediction result is obtained by predicting the overall control parameter of the plurality of signal transmitters in the first time period based on a zeroth noise signal at the position of the target person in the target workshop in a zeroth time period, wherein the zeroth time period is a history time period of the first time period;

constructing a second characteristic sequence based on a historical parameter prediction result and on an unknown parameter sequence, wherein the unknown parameter sequence is an input sequence corresponding to the current parameter prediction result; and predicting the overall control parameter of the plurality of signal transmitters in the second time period by using a target time sequence model based on the first characteristic sequence and the second characteristic sequence, to obtain the current parameter prediction result.

14. The non-transitory computer-readable storage medium of claim 13, wherein the constructing the first characteristic sequence based on the first noise signal and on the historical parameter prediction result comprises:

obtaining a noise signal sequence arranged according to a time sequence based on the first noise signal;

obtaining a known parameter sequence arranged according to the time sequence based on the historical parameter prediction result;

splicing the known parameter sequence on the noise signal sequence to obtain a first initial sequence;

obtaining a first additional characteristic based on real-time task information of the target workshop; and constructing the first characteristic sequence based on the first initial sequence and the first additional characteristic.

15. The non-transitory computer-readable storage medium of claim 13, wherein the constructing the second characteristic sequence based on the historical parameter prediction result and on the unknown parameter sequence comprises:

obtaining the known parameter sequence arranged according to the time sequence based on the historical parameter prediction result;

splicing the unknown parameter sequence on the known parameter sequence to obtain a second initial sequence;

obtaining a second additional characteristic based on the real-time task information of the target workshop; and constructing the second characteristic sequence based on the second initial sequence and the second additional characteristic.

16. The non-transitory computer-readable storage medium of claim 13, wherein the target time sequence model comprises an encoder and a decoder; and the predicting the overall control parameter of the plurality of signal transmitters in the second time period by using the target time sequence model based on the first characteristic sequence and the second characteristic sequence to obtain the current parameter prediction result comprises:

inputting the first characteristic sequence into the encoder, to process the first characteristic sequence by using a characteristic processing layer including a first self-attention module and a distillation module in the encoder to obtain a first characteristic mapping result;

inputting the second characteristic sequence into a second self-attention module in the encoder, to process the second characteristic sequence by using the second self-attention module to obtain a second characteristic mapping result; and inputting the first characteristic mapping result and the second characteristic mapping result into a mutual attention module in the encoder, to process the first characteristic mapping result and the second characteristic mapping result by using the mutual attention module to obtain a characteristic processing result, wherein the characteristic processing result includes the current parameter prediction result obtained by predicting the overall control parameter of the plurality of signal transmitters in the second time period.

17. The non-transitory computer-readable storage medium of claim 13, wherein the operations further comprise:

eliminating an abnormal signal from the first noise signal to obtain a new first noise signal, wherein the obtaining current parameter prediction result of the plurality of signal transmitters in the second time period based on the first noise signal comprises:

predicting the overall control parameter of the plurality of signal transmitters in the second time period based on the new first noise signal, to obtain the current parameter prediction result.

* * * * *